US012216528B2

(12) United States Patent
Kono et al.

(10) Patent No.: US 12,216,528 B2
(45) Date of Patent: Feb. 4, 2025

(54) MONITORING SYSTEM, MONITORING APPARATUS, AND MONITORING METHOD

(71) Applicant: Hitachi Industrial Equipment Systems Co., Ltd., Tokyo (JP)

(72) Inventors: Masashi Kono, Tokyo (JP); Yuusuke Nakagawa, Tokyo (JP); Hidetoshi Honjo, Tokyo (JP); Kenji Kimura, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 35 days.

(21) Appl. No.: 17/912,109

(22) PCT Filed: Mar. 4, 2021

(86) PCT No.: PCT/JP2021/008356
§ 371 (c)(1),
(2) Date: Sep. 16, 2022

(87) PCT Pub. No.: WO2021/187128
PCT Pub. Date: Sep. 23, 2021

(65) Prior Publication Data
US 2023/0136749 A1 May 4, 2023

(30) Foreign Application Priority Data
Mar. 16, 2020 (JP) ................................ 2020-044944

(51) Int. Cl.
*G06F 11/07* (2006.01)
(52) U.S. Cl.
CPC ........ *G06F 11/076* (2013.01); *G06F 11/0736* (2013.01); *G06F 11/0766* (2013.01)
(58) Field of Classification Search
CPC . G06F 11/076; G06F 11/0736; G06F 11/0766
(Continued)

(56) References Cited

U.S. PATENT DOCUMENTS

2008/0256406 A1\* 10/2008 Arnold ............. G01R 31/31912
714/727
2012/0278135 A1\* 11/2012 Haber .................... G06Q 10/00
705/7.38
(Continued)

FOREIGN PATENT DOCUMENTS

JP 2003-296851 A 10/2003
JP 2014-153736 A 8/2014
(Continued)

OTHER PUBLICATIONS

Wikipedia "black box" page, retrieved from https://en.wikipedia.org/wiki/Black_box (Year: 2023).*
(Continued)

*Primary Examiner* — Yair Leibovich
(74) *Attorney, Agent, or Firm* — Crowell & Moring LLP

(57) ABSTRACT

A monitoring apparatus includes: an input unit that accepts equipment identifying information for identifying monitoring object equipment and an analysis purpose; and an output unit that, when analysis item data corresponding to the analysis purpose among operation data indicating an operating status of the identified monitoring object equipment is a value within a specified range on the basis of the equipment identifying information and the analysis purpose which have been input, outputs a tendency of the analysis item data compared with predetermined comparison item data. According to the above-described configuration, the status of the monitoring object equipment can be diagnosed and visualized for the sake of the condition based maintenance to perform maintenance in accordance with the status of each equipment.

10 Claims, 15 Drawing Sheets

(58) Field of Classification Search
USPC .......................................................... 714/26
See application file for complete search history.

(56) References Cited

U.S. PATENT DOCUMENTS

| | | | |
|---|---|---|---|
| 2016/0364699 A1 | 12/2016 | Steketee et al. | |
| 2017/0059501 A1* | 3/2017 | Peterson | G01N 33/005 |
| 2019/0222524 A1 | 7/2019 | Naraki | |

FOREIGN PATENT DOCUMENTS

| | | |
|---|---|---|
| JP | 2016-529630 A | 9/2016 |
| JP | 2019-125252 A | 7/2019 |

OTHER PUBLICATIONS

International Search Report (PCT/ISA/210) issued in PCT Application No. PCT/JP2019/008356 dated May 25, 2021 with English translation (four (4) pages).
Japanese-language Written Opinion (PCT/ISA/237) issued in PCT Application No. PCT/JP2019/008356 dated May 25, 2021 (three (3) pages).
International Search Report (PCT/ISA/210) issued in PCT Application No. PCT/JP2021/008356 dated May 25, 2021 with English translation (four (4) pages).
Japanese-language Written Opinion (PCT/ISA/237) issued in PCT Application No. PCT/JP2021/008356 dated May 25, 2021 (three (3) pages).

* cited by examiner

FIG. 6

| | 30 | 31 | 32 | 33 | 34 |
|---|---|---|---|---|---|
| | EQUIPMENT | PRODUCTION NUMBER | MODEL | INSTALLATION SITE ADDRESS | INSTALLATION DATE |
| | EQUIPMENT 1 | XXX1234 | Model A | XX State OO City | 2015/8/15 |
| | EQUIPMENT 2 | XXX1236 | Model B | XX State ΔΔ City | 2017/9/2 |
| | EQUIPMENT 3 | XXX1256 | Model C | ΔΔ State XXX City | 2014/12/2 |

FIG. 7

| MODEL | TEMPERATURE | PRESSURE | ELECTRIC CURRENT |
|---|---|---|---|
| Model A | INTERNAL EQUIPMENT TEMPERATURE | INTERNAL EQUIPMENT PRESSURE | LOAD CURRENT |
| Model B | INTERNAL EQUIPMENT TEMPERATURE 1 | INTERNAL EQUIPMENT PRESSURE 1 | LOAD CURRENT |
| | INTERNAL EQUIPMENT TEMPERATURE 2 | INTERNAL EQUIPMENT PRESSURE 2 | |
| Model C | INTERNAL EQUIPMENT TEMPERATURE | INTERNAL EQUIPMENT PRESSURE | LOAD CURRENT |

Columns: 40, 41, 42, 43

FIG. 9

| ANALYSIS ITEM ~60 | COMPARISON ITEM ~61 |
|---|---|
| INTERNAL EQUIPMENT TEMPERATURE | AMBIENT TEMPERATURE |
| INTERNAL EQUIPMENT TEMPERATURE 1 | AMBIENT TEMPERATURE 1 |
| INTERNAL EQUIPMENT TEMPERATURE 2 | AMBIENT TEMPERATURE 2 |
| INTERNAL EQUIPMENT PRESSURE | INTERNAL EQUIPMENT PRESSURE 3 |
| INTERNAL EQUIPMENT PRESSURE 1 | INTERNAL EQUIPMENT PRESSURE 5 |
| INTERNAL EQUIPMENT PRESSURE 2 | INTERNAL EQUIPMENT PRESSURE 6 |
| MOTOR CURRENT | MOTOR CURRENT UPON MAXIMUM LOAD |

FIG. 10

| ACQUISITION DATE AND TIME ~70 | COMPARISON ITEM ~71 | NUMERICAL VALUE ~72 | COMPARISON ITEM ~73 | NUMERICAL VALUE ~74 |
|---|---|---|---|---|
| 2015/8/15 (Upon installment) | INTERNAL EQUIPMENT TEMPERATURE | 93[°C] | AMBIENT TEMPERATURE | 33[°C] |
| ⋮ | | ⋮ | ⋮ | ⋮ |
| 2018/5/13 (One year ago) | INTERNAL EQUIPMENT TEMPERATURE | 91[°C] | AMBIENT TEMPERATURE | 30[°C] |
| ⋮ | | ⋮ | ⋮ | ⋮ |
| 2019/4/13 (One month ago) | INTERNAL EQUIPMENT TEMPERATURE | 92[°C] | AMBIENT TEMPERATURE | 31[°C] |

FIG. 11

| ACQUISITION DATE AND TIME | ANALYSIS ITEM | NUMERICAL VALUE | COMPARISON ITEM | NUMERICAL VALUE |
|---|---|---|---|---|
| ⋮ | | | | |
| 2019/5/13 9:00 | INTERNAL EQUIPMENT TEMPERATURE | 85[°C] | AMBIENT TEMPERATURE | 18[°C] |
| 2019/5/13 10:00 | INTERNAL EQUIPMENT TEMPERATURE | 87[°C] | AMBIENT TEMPERATURE | 20[°C] |
| 2019/5/13 11:00 | INTERNAL EQUIPMENT TEMPERATURE | 88[°C] | AMBIENT TEMPERATURE | 21[°C] |
| 2019/5/13 12:00 | INTERNAL EQUIPMENT TEMPERATURE | 89[°C] | AMBIENT TEMPERATURE | 21[°C] |
| 2019/5/13 13:00 | INTERNAL EQUIPMENT TEMPERATURE | 93[°C] | AMBIENT TEMPERATURE | 21[°C] |
| 2019/5/13 14:00 | INTERNAL EQUIPMENT TEMPERATURE | 92[°C] | AMBIENT TEMPERATURE | 22[°C] |
| ⋮ | | | | |

FIG. 12

| 90 | 91 | 92 | 93 |
|---|---|---|---|
| OCCURRENCE DATE AND TIME | PRODUCTION NUMBER | MODEL | ALARM/FAILURE CONTENT |
| 2018/8/15 | XXX1234 | Model A | XX Failure |
| 2018/9/2 | XXX1234 | Model A | XX Alarm |
| 2018/12/2 | XXX1234 | Model A | ΔΔ Failure |

MONITORING SYSTEM, MONITORING APPARATUS, AND MONITORING METHOD

TECHNICAL FIELD

The present invention relates to a monitoring system, monitoring apparatus, and monitoring method for monitoring an operating status of monitoring object equipment.

BACKGROUND ART

The way of maintenance of equipment is making the transition from time based maintenance to perform periodic maintenance to condition based maintenance to perform maintenance according to the status of each equipment. It is necessary to always monitor the status in order to carry out the condition based maintenance and a remote monitoring service using IoT cloud has been being widely spread.

PTL 1 is known as a technique regarding a monitoring apparatus for monitoring equipment and detecting a predictive failure sign(s). PTL 1 recites that "monitoring data of a monitoring object system during a period in which no anomaly was detected regarding the monitoring object system is classified by days of week, time slots, dates, or the number of weeks and is stored in a storage unit, a permissible range is set based on a distribution by the days of week, time slots, dates, or the number of weeks of the stored monitoring data, and the monitoring data currently acquired from the monitoring object system is compared with the permissible range based on the distribution of the monitoring data of the relevant day of week, time slot, date, or the number of the relevant week to which the current date and time belongs; and if the acquired monitoring data exceeds an upper limit or a lower limit of the permissible range, a computer is caused to execute processing for detecting a predictive failure sign of the monitoring object system."

CITATION LIST

Patent Literature

PTL 1: Japanese Patent Application Laid-Open (Kokai) Publication No. 2014-153736

SUMMARY OF THE INVENTION

Problems to be Solved by the Invention

PTL 1 discloses the technique for implementing the processing for detecting the predictive failure sign by using an appropriate threshold value according to the operating status of a computer system which is a monitoring object. However, the predictive failure sign is judged based on whether the result of monitoring the monitoring object equipment exceeds the threshold value or not; and there is no description about a method for judging the status of the equipment within the permissible range.

In order to realize the condition based maintenance of industrial equipment, it is required to judge not only whether a failure has occurred or not, but also judge the status of the equipment. It is an object of the present invention to provide a monitoring apparatus and monitoring system for diagnosing and visualizing the status of the monitoring object equipment for the sake of the condition based maintenance to perform the maintenance in accordance with the status of each equipment.

Means to Solve the Problems

A preferred example of the present invention is a monitoring apparatus including: an input unit that accepts equipment identifying information for identifying monitoring object equipment and an analysis purpose; and an output unit that, when analysis item data corresponding to the analysis purpose among operation data indicating an operating status of the identified monitoring object equipment is a value within a specified range on the basis of the equipment identifying information and the analysis purpose which have been input, outputs a tendency of the analysis item data compared with predetermined comparison item data.

Advantageous Effects of the Invention

The status of the equipment can be visualized according to the present invention.

BRIEF DESCRIPTION OF DRAWINGS

FIG. 6 is a diagram illustrating a data format of an equipment identifying information DB;

FIG. 7 is a diagram illustrating a data format of an analysis item DB;

FIG. 9 is a diagram illustrating a data format of a comparison item DB;

FIG. 10 is a diagram illustrating a data format of a comparison data DB;

FIG. 11 is a diagram illustrating a data format of an analysis data DB;

FIG. 12 is a diagram illustrating a data format of an alarm and failure information DB 227;

DESCRIPTION OF EMBODIMENTS

Embodiments will be described below with reference to the drawings.

Embodiment 1

Figure 1:
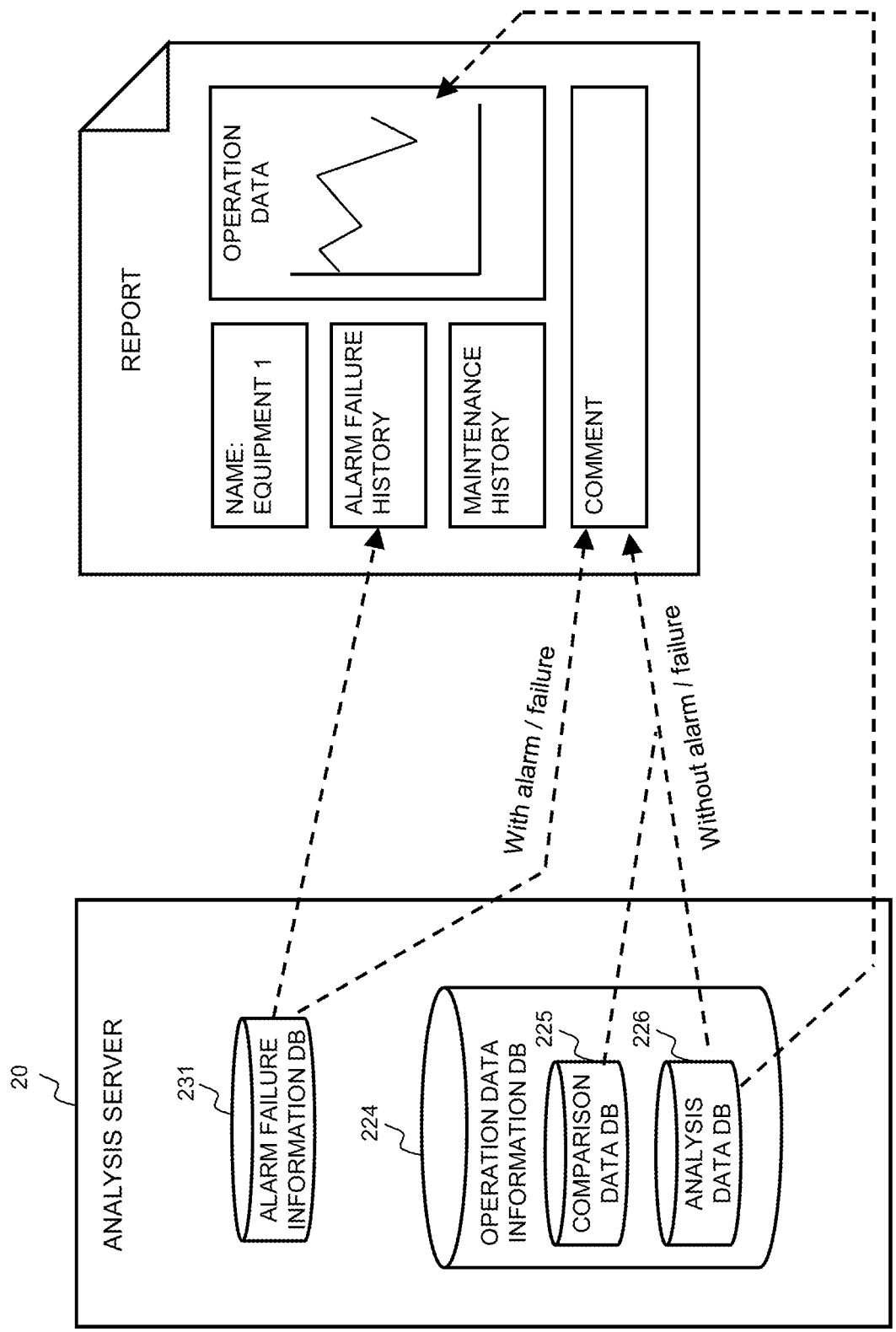
FIG. 1 is a conceptual diagram illustrating the concept of a monitoring system according to Embodiment 1.

Firstly, the concept of a monitoring system according this embodiment will be explained. FIG. 1 is a conceptual diagram illustrating the concept of a monitoring system according to Embodiment 1. An analysis server 20 illustrated in FIG. 1 has a plurality of databases regarding the status of monitoring object equipment.

The monitoring object equipment is, for example, industrial equipment like an air compressor. The monitoring object equipment has a communication function and transmits data regarding the status to the analysis server 20 as appropriate. The analysis server 20 registers and manages alarms, failures, etc., which have occurred at the monitoring object equipment, in an alarm and failure information DB (DataBase) 227. Furthermore, the analysis server 20 registers and manages data regarding the operation of the monitoring object equipment, as operation data, in an operation data information DB 224.

The operation data information DB 224 includes a comparison data DB 225 and an analysis data DB 226. Operation data of a specified period which is an analysis object is registered as analysis data in the analysis data DB 226. Data to be used for a comparison with the analysis data is registered in the comparison data DB 226. For example, if the specified period is the last three months, the operation data for the past three months may be registered in the analysis data DB 226 and the operation data before the last three months may be accumulated in the comparison data DB 225.

The analysis server 20 can utilize these databases and automatically generate a report regarding the operating status of the monitoring object equipment. The generated report is visualized via display output or print output. For example, a support staff member in charge of the maintenance of the monitoring object equipment can print the report automatically generated by the analysis server 20 and provide it to a user of the monitoring object equipment.

Referring to FIG. 1, the report is provided with fields of a name, a graph of the operation data, an alarm and failure history, a maintenance history, and a comment. The name is provided to identify the object equipment and is "Equipment 1" in FIG. 1. The alarm and failure history is extracted from the alarm and failure information DB 227. The maintenance history is extracted from, for example, a database for managing a maintenance history (which is not illustrated in the drawing). The graph of the operation data is extracted from the analysis data DB 226 and is displayed as a graph.

Comment data which reports the operating status of the monitoring object equipment is inserted into the comment field. The comment data functions as a general comment in the report and is not suited for uniform generation. For example, when generating the comment data, it is necessary to keep an amount of the comment within a proper range. This is because the size of the comment field for the display output or the print output is limited and also there occurs a risk of skipping without reading the comment if a large amount of information is listed. Therefore, if there is/are a report item(s) with high importance, it is desired that any item(s) with low importance should be omitted. On the other hand, if there is no report item with high importance, even the item(s) with low importance should also be reported. Particularly, from the viewpoint of the condition based maintenance, we can say that the challenge would be how early a report can be made to state that the operation data does not exceed a warning threshold value, but is in a state requiring caution (while the importance is low), rather than a report to state that the operation data exceeded the warning threshold value and the warning was made.

If the threshold value were simply lowered under this circumstance in order to judge that the operation data is in the state requiring caution, the warning could be made early, but the precision of the warning would degrade and the reliability would be impaired. So, the monitoring system according to this embodiment is designed so that if the analysis data which does not satisfy the warning threshold value, but is within a specified range close to the warning threshold value exists, a tendency of the analysis data as compared with comparison data is output as the comment.

Specifically, if an alarm or failure is registered in the alarm and failure information DB 227 as illustrated in FIG. 1, the analysis server 20 sets an actual result of the alarm or failure as the comment data. Then, if the alarm or failure is not registered, a tendency of the analysis data DB 226 as compared with the comparison data of the comparison data DB 225 is set as the comment data.

Figure 2:
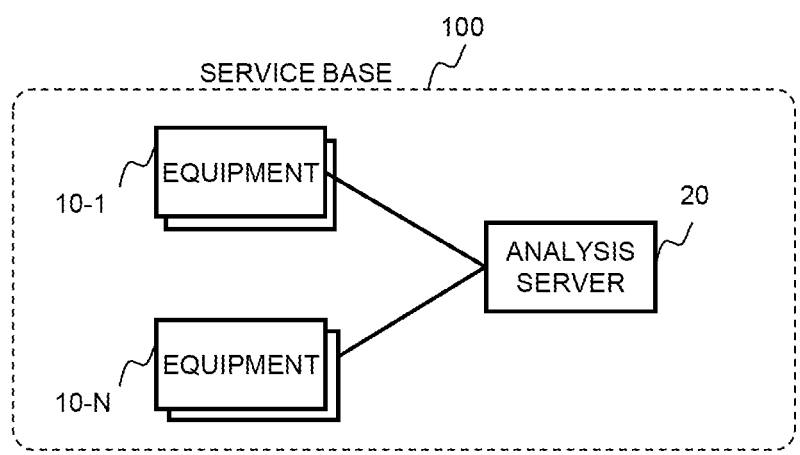
FIG. 2 is a configuration diagram illustrating the monitoring system according to Embodiment 1.

Next, the configuration of the monitoring system according to Embodiment 1 will be explained. FIG. 2 is a configuration diagram illustrating the monitoring system according to Embodiment 1. The monitoring system according to Embodiment 1 is configured by connecting communication, for example, via wired or wireless communication between the analysis server 20 and a plurality of pieces of equipment 10 in a service base 100 which is a place to provide services. FIG. 2 shows examples of equipment 10-1 to equipment 10-N as the plurality of pieces of equipment 10.

Figure 3:
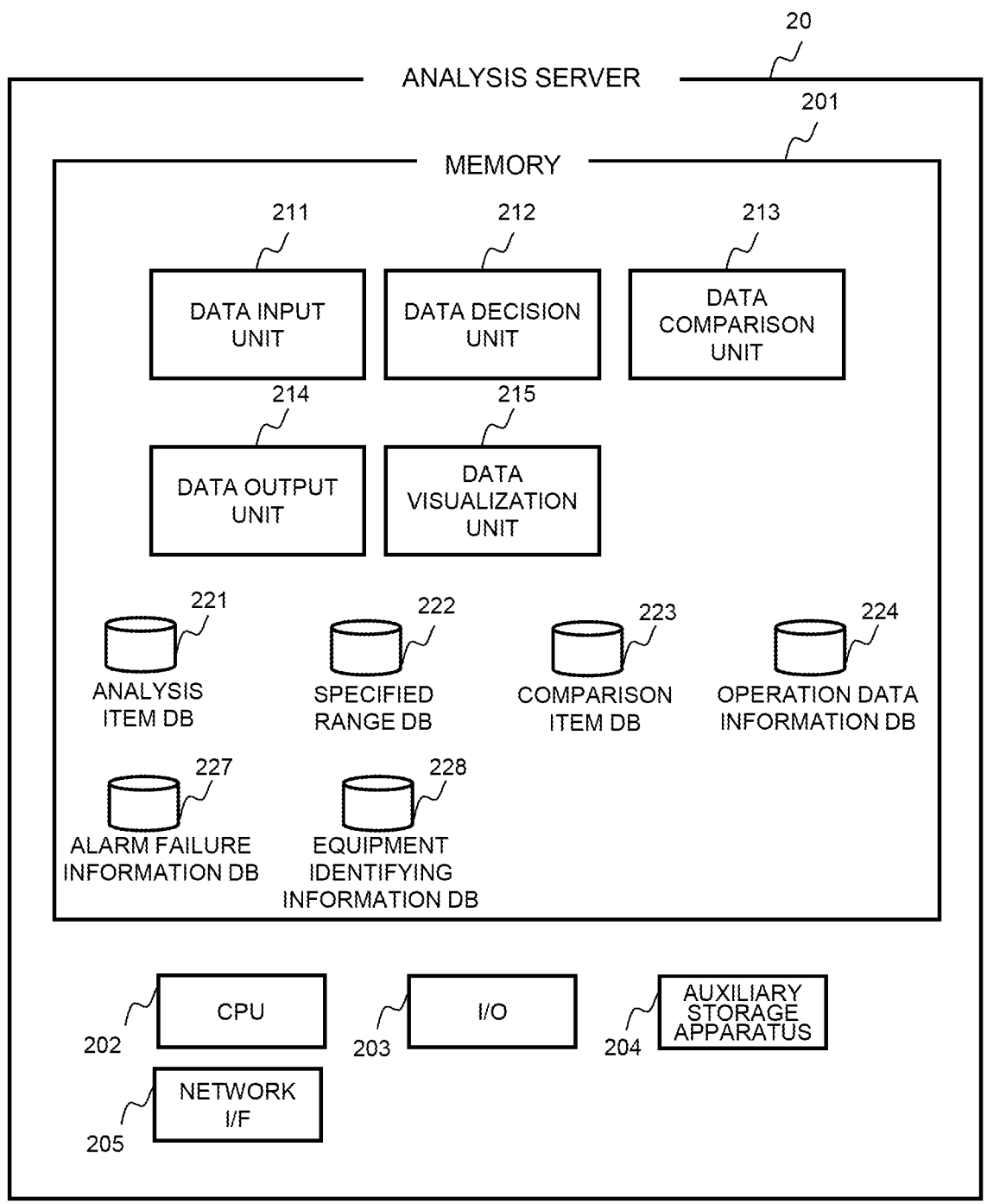
FIG. 3 is a diagram illustrating the configuration of an analysis server.

FIG. 3 is a diagram illustrating an example of the configuration of the analysis server 20. The processing content of the analysis server 20 is stored (or recorded) in a form of a program(s) (software) in an auxiliary storage apparatus 204, which is a general computer, and a CPU (Central Processing Unit) 202 decompresses the program(s), which has been read from the auxiliary storage apparatus 204, in a memory 201 and executes it. The analysis server 20 communicates with other servers and equipment via a network I/F 205.

An I/O (input/output interface) 203 is a user interface for a user to input instructions to the analysis server 20 and to present, for example, the execution results of the program to the user. Input/output devices (such as a keyboard, a mouse, a touch panel, a display, and a printer) are connected to the I/O 203. A user interface which is provided by an administrative terminal connected via the network may be connected to the I/O 203.

The CPU 202 is a processor for executing the program(s) stored in the memory 201. The memory 201: is configured from, for example, a RAM (Random Access Memory) which is a volatile storage element; and functions as a main storage apparatus for temporarily decompressing data related to the execution of the program(s).

Specifically, the memory 201 stores programs which operate as functional units such as a data input unit 211, a data decision unit 212, a data comparison unit 213, a data output unit 214, and a data visualization unit 215.

Furthermore, the memory 201 temporarily stores data such as an analysis item DB 221, a specified range DB 222, a comparison item DB 223, an operation data information DB 224, an alarm and failure information DB 227, an equipment identifying information DB 228 as necessary.

The auxiliary storage apparatus 204 is, for example, a large-capacity and nonvolatile storage apparatus such as a magnetic storage apparatus (HDD: Hard Disk Drive) and a flash memory (SSD: Solid State Drive). Furthermore, the auxiliary storage apparatus 204 stores the program(s) executed by the CPU 202 and data to be used when executing the program(s). Specifically speaking, the program(s) is read from the auxiliary storage apparatus 204, is loaded to the memory 201, and is executed by the CPU 202.

The analysis server 20 is a computer system configured in a physically one computer or in a logically or physically plurality of computers; and the program(s) stored in the memory 201 may operate in separate threads in the same computer or may operate in a virtual computer which is constructed in a plurality of physical computer resources. Furthermore, the analysis server 20 and other devices may be accommodated in one physical or logical computer. Incidentally, the entire or part of processing implemented by executing the program(s) may be implemented by hardware (for example, Field-Programmable Gate Array).

Figure 4:
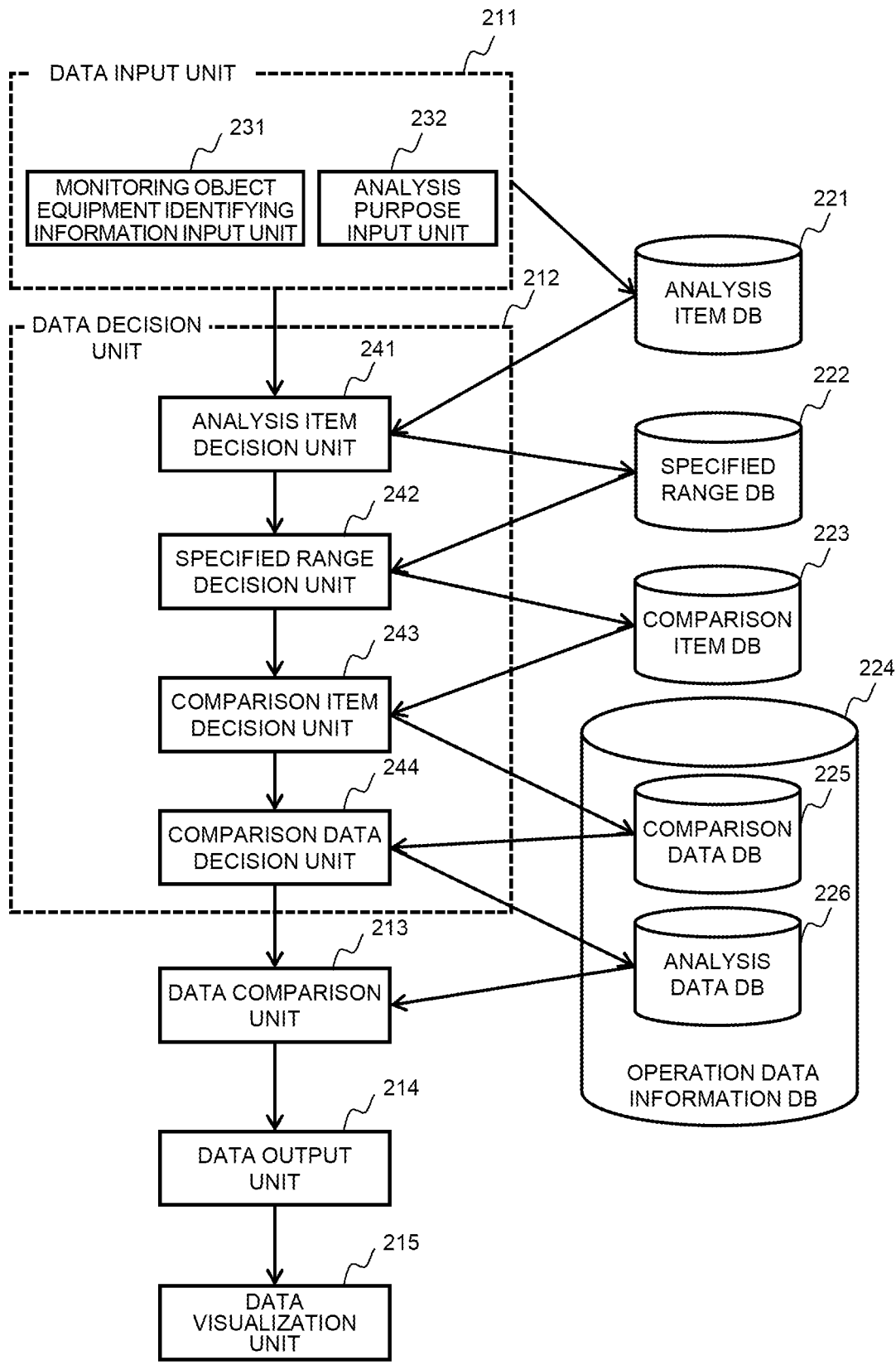
FIG. 4 is a diagram illustrating functional blocks of the analysis server.

FIG. 4 is a diagram illustrating functional blocks of the analysis server 20. The analysis server 20 includes, as illustrated in FIG. 4, the data input unit 211, the data decision unit 212, the data comparison unit 213, the data output unit 214, and the data visualization unit 215.

The data input unit 211 includes a monitoring object equipment identifying information input unit 231 and an analysis purpose input unit 232. The monitoring object equipment identifying information input unit 231 accepts input of equipment identifying information for uniquely identifying the equipment 10. The equipment identifying information is, for example, an equipment ID. The analysis purpose input unit 232 accepts input of an analysis purpose. For example, parameters indicating the status of the equipment such as a temperature, a pressure, and an electric current can be designated as the analysis purpose.

The data decision unit 212 includes an analysis item decision unit 241, a specified range decision unit 242, a comparison item decision unit 243, and a comparison data decision unit 244.

The analysis item decision unit 241 extracts an analysis item from the analysis item DB 221 in accordance with the monitoring object equipment identifying information and the analysis purpose, which are accepted by the data input unit 211, and decides the analysis item. This analysis item is data as an analysis object corresponding to the analysis purpose among the operation data indicating the operating status of the equipment. For example, if the temperature is designated as the analysis purpose, data of the temperature such as an internal equipment temperature among the operation data of the equipment identified by the monitoring object equipment identifying information becomes the analysis item. Incidentally, if a plurality of analysis items corresponding to the purpose exist as in a case where internal equipment temperatures are acquired at a plurality of positions in the equipment as the operation data, one or a plurality of analysis items among the above-described analysis items can be an candidate or candidates for the analysis item.

The specified range decision unit 242 extracts a specified range from the specified range DB 222 in accordance with the analysis item decided by the analysis item decision unit 241 and decides the specified range. This specified range is a range which does not satisfy a warning threshold value, but is close to the warning threshold value and which should be a comment object.

The comparison item decision unit 243 extracts a comparison item from the comparison item DB 223 in accordance with the specified range decided by the specified range decision unit 242 and decides the comparison item. The comparison item decided here is data of a different type from that of the analysis item data and is data having a correlation with the analysis item data. For example, if the analysis item is an internal equipment temperature, an ambient temperature (a surrounding air temperature) can be used as the comparison item. Incidentally, for example, if internal equipment temperatures are acquired at a plurality of positions in the equipment, the internal equipment temperatures at different positions will be treated as data of different types. Furthermore, even if the data are acquired at the same position in the same equipment, the data with different conditions will be treated as data of different types. For example, if an internal equipment pressure at a specified position is designated as the analysis item, an internal equipment pressure at a different position in the same equipment may be used as the comparison item. Similarly, if a motor current is designated as the analysis item, a motor current upon maximum load can be used as the comparison item.

The comparison data decision unit 244 extracts comparison data from the comparison data DB 225, which is stored in the operation data information DB 224, and decides the comparison data. The comparison data decided here is data of the same type as that of the analysis item data and is data acquired under a different environment from that of the analysis item data. For example, the operation data acquired in the past regarding the object equipment can be used as the comparison data. As one example, if internal equipment temperatures in the past three months are used as the analysis item data, internal equipment temperature before the past three months are used as the comparison data.

Incidentally, if there is a comparison item decided by the comparison item decision unit 243, data of the same type as that of the comparison item decision unit 243 regarding the comparison data can be further added to the comparison item. For example, if the analysis item is an internal equipment temperature and the comparison item is an ambient temperature, a combination of the internal equipment temperature and the ambient temperature of three or more months ago is used.

The data comparison unit 213 extracts the analysis data from the analysis data 226, which is stored in the operation data information DB 224, and compares the analysis data with the comparison item data and the comparison data. This comparison can find a tendency of the analysis data.

The data output unit 214 outputs the result of the comparison by the data comparison unit 213 in a form of, for example, comment data to the data visualization unit 215. Incidentally, if an alarm or failure is registered in the alarm and failure information DB 227, the data output unit 214 outputs an actual result of the alarm or failure as the comment data to the data visualization unit 215. Specifically speaking, the data output unit 214 can decide to adopt or reject what to be output as the comment data.

The data visualization unit 215 automatically creates a report by processing various kinds of information, including the comment data which is input from the data output unit 214, into a format as a report and visualizes the created report. This visualization can be implemented by display output or print output.

Figure 5:
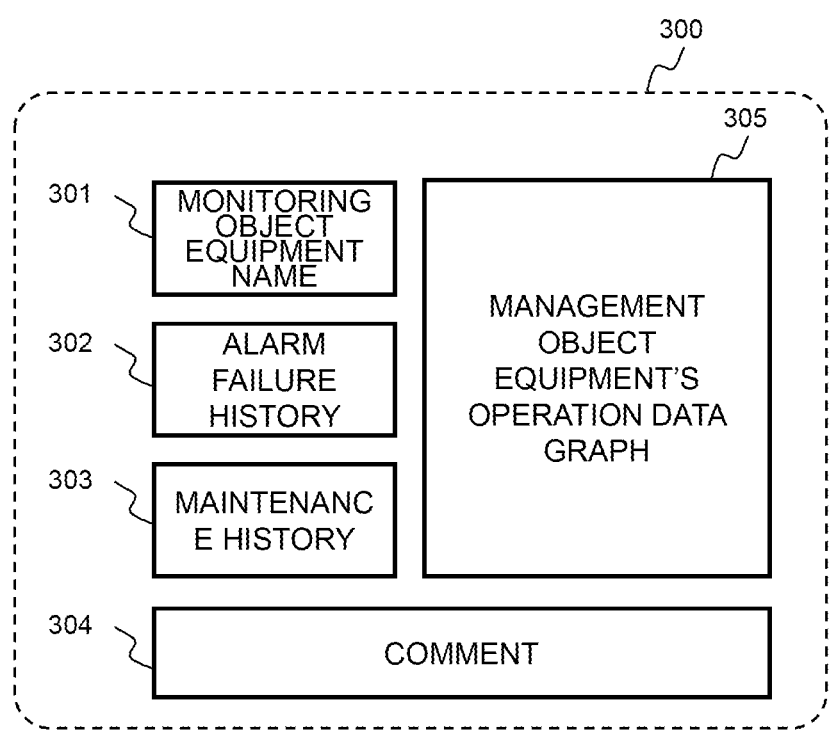
FIG. 5 is a diagram illustrating an example of visualization.

FIG. 5 is a diagram illustrating an example of the visualization by the data visualization unit 215. The visualized display screen example 300 is configured by including, as illustrated in FIG. 5, display areas which respectively display a monitoring object equipment name 301, an alarm and failure history 302, a maintenance history 303, a comment 304, and an operation data graph 305 of the monitoring object equipment. Incidentally, the configuration of the visualization illustrated in FIG. 5 is one example and the visualization may be implemented in various configurations. Furthermore, regarding visualization media, if the visualization is performed on a web, the visualization may be implemented in a paper medium or in a file format. Now, an explanation will be provided below about a case of the visualization as the report.

FIG. 6 is a diagram illustrating a data format of the equipment identifying information 228. The equipment identifying information 228 is, as illustrated in FIG. 6, a database for recording equipment 30, a production number 31, a model 32, an installation site address 33, an installation date 34, and so on. The equipment 30 is identification information for a user of the analysis server 20 to uniquely identify the equipment. The production number 31 is identification information of the equipment which is attached by a manufacturer of the equipment. If the analysis server 20 and all pieces of equipment are located in the same service base, the management of addresses by the installation site address 33 is unnecessary. However, by assuming a case where pieces of equipment are distributed and located at a plurality of addresses, or a case where the analysis server 20 is installed at a different location from that of equipment, the equipment identifying information 228 is provided with an item for the installation site address 33.

FIG. 7 is a diagram illustrating a data format of the analysis item DB 221. The analysis item DB 221 is a database which records a model 40, a temperature 41, a pressure 42, and an electric current 43. If the model 40 is "Model A," one item can be selected as an analysis item for each item of the temperature, the pressure, and the electric current. On the other hand, if the model 40 is "Model B," there are two items which can be selected as analysis items for each item of the temperature and the pressure and there is one item for the electric current. Accordingly, the internal equipment temperature(s) and the internal equipment pressure(s) are sometimes acquired at a plurality of positions depending on the machine type identified by the model 40 and the analysis items can be selected from the plurality of positions.

Figure 8:
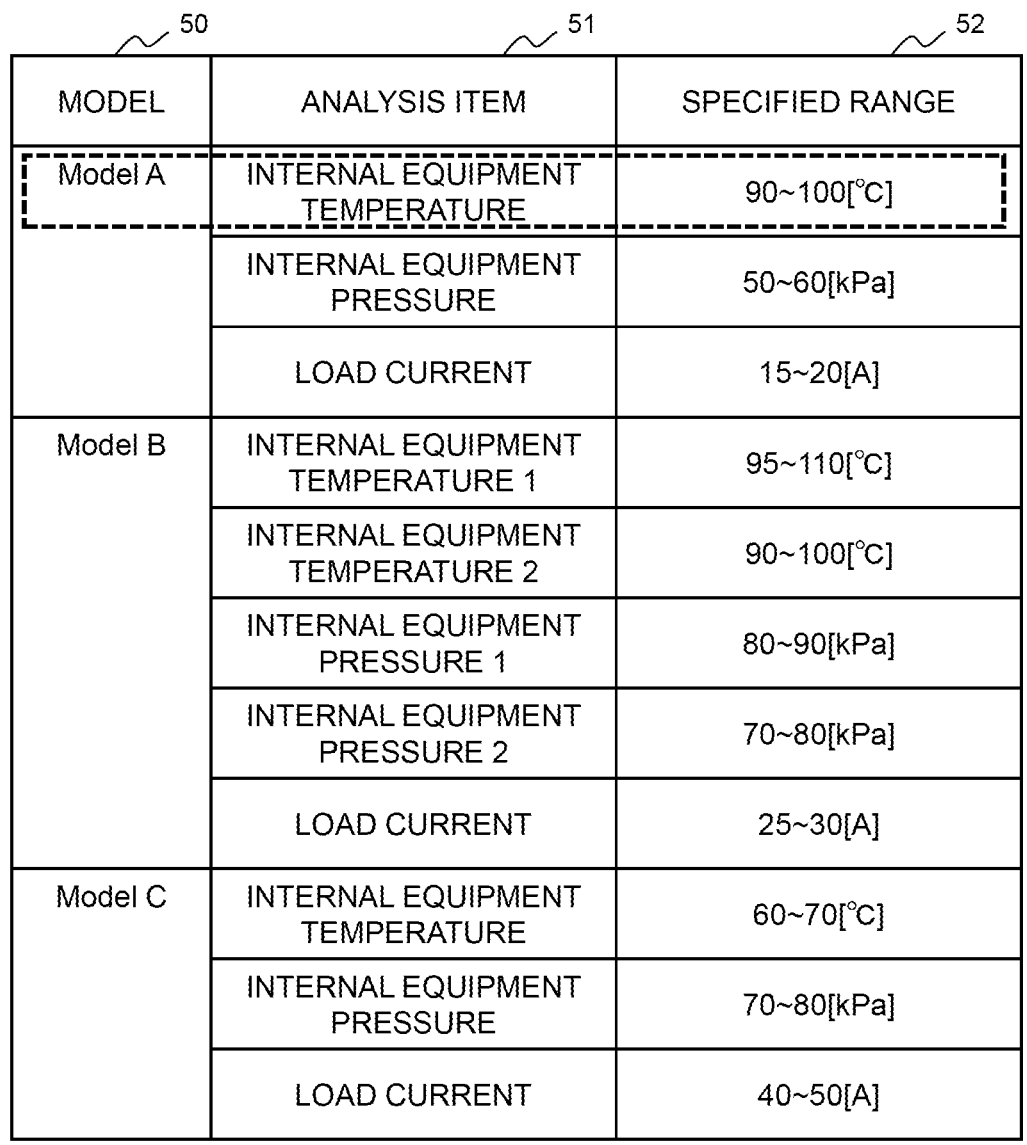
FIG. 8 is a diagram illustrating a data format of a specified range DB.

FIG. 8 is a diagram illustrating a data format of the specified range DB 222. The specified range DB 222 is a database which records a model 50, an analysis item 51, and a specified range 52. The specified range is a range which does not satisfy a warning threshold value, but is close to the warning threshold value. In other words, the specified range is a range to be included within a normal operation range which does not satisfy a condition for anomaly detection, but for which a comment to call for attention should be reported. If the relevant machine type has the analysis items which can be selected from a plurality of positions as illustrated in FIG. 8, the specified range is set individually to each of them.

FIG. 9 is a diagram illustrating a data format of the comparison item DB 223. The comparison item DB 223 is a database which records an analysis item 60 and a comparison item 61. In FIG. 9, if the analysis item is an internal equipment temperature, an ambient temperature is associated with it as a comparison item. Furthermore, if the analysis item is an internal equipment pressure, an internal equipment pressure at another position in the same equipment is associated with it as a comparison item. Under this circumstance, the internal equipment pressure which is associated as the comparison item may be the one at the position which is not selected as the analysis item. Incidentally, if the analysis item is a motor current, a motor current upon maximum load is used as the analysis item as one example.

FIG. 10 is a diagram illustrating a data format of the comparison data DB 225 which is stored in the operation data information DB 224. The comparison data 225 is a database which records an acquisition date and time 70, a first comparison item 71, a numerical value 72 of the first comparison item, a second comparison item 73, and a numerical value 74 of the second comparison item. The first comparison item 71 is data of the same type as that of the analysis item 60 in the comparison item DB 223. The second comparison item 73 is data of the same type as that of the comparison item 61 in the comparison item DB 223.

FIG. 11 is a diagram illustrating a data format of the analysis data DB 226 which is stored in the operation data information DB 224. The analysis data DB 226 is a database which records an acquisition date and time 80, an analysis item 81, a numerical value 82 of the analysis item, a comparison item 83, and a numerical value 84 of the comparison item.

FIG. 12 is a diagram illustrating a data format of the alarm and failure information DB 227. The alarm and failure information DB 227 is a database which records an alarm or failure occurrence date and time 90, a production number 91, a model 92, and alarm or failure content 93.

Incidentally, this embodiment 1 is explained about the configuration for managing various kinds of information by using the databases; however, these pieces of information may not necessarily have to be expressed in the data structure of databases, but may be expressed in data structures of lists, tables, etc. or in any other structures. Therefore, the "table(s)," "list(s)," "DB," etc. may sometimes be simply called "information."

Figure 13:
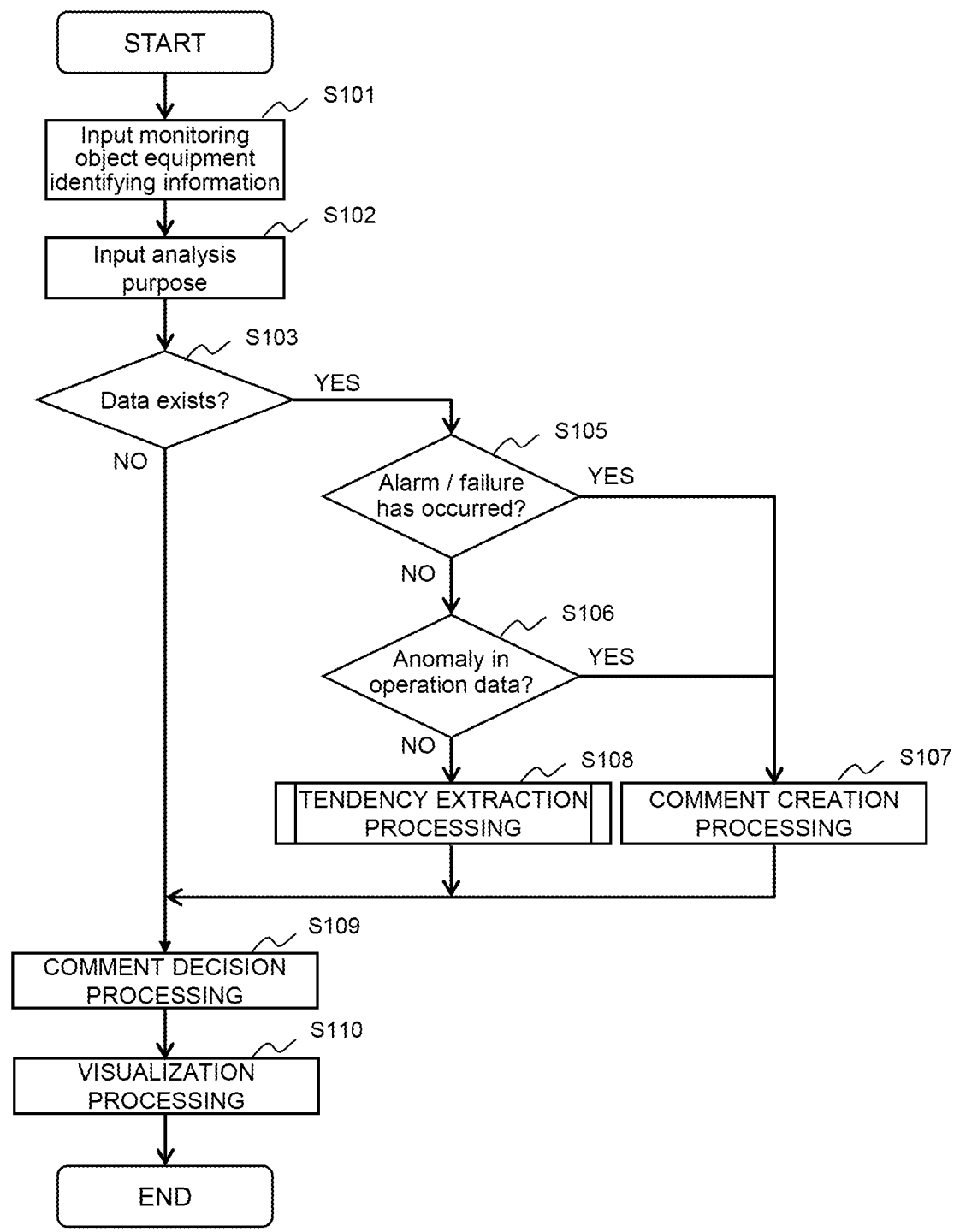
FIG. 13 is a diagram illustrating a processing flow for creating a report.

FIG. 13 is a diagram illustrating a processing flow of creating a report. Firstly, the monitoring object equipment identifying information input unit 231 accepts input of monitoring object equipment identifying information (for example, the production number XXX1234) via an input/output device or the like (S101). Equipment 1 as the name of the equipment with the production number linked to XXX1234, "Model A" as the name of the model, "XX State, OO City" as the installation site address, and "Aug. 15, 2015" as the installation date are extracted from the input result of S101 and the equipment identifying information 228 in FIG. 6.

Subsequently, the analysis purpose input unit 232 accepts input of the analysis purpose (for example, to examine the tendency regarding the temperature) via the input/output device or the like (S102). For example, "the model is Model A and the temperature is an internal equipment temperature" is extracted from the input results in S101 and S102 and the analysis item DB 221 in FIG. 7.

The monitoring object equipment and the analysis item for creating a report has been decided by the processing described above.

The data decision unit 212 judges whether data linked to the monitoring object equipment decided by the operation data information DB 224 exists or not (S103); and if the data does not exist, the processing proceeds to comment decision processing by the data output unit 214 (S109). If the data exists, the data decision unit 212 judges, from the alarm and failure information DB 227, whether data linked to the decided monitoring object equipment exists or not (S105).

If the data exists, the data decision unit 212 proceeds to the comment creation processing (S107) by the data output unit 214. If the data does not exist, the data decision unit 212 extracts the analysis data linked to the decided monitoring object equipment from the analysis data information DB 226 and judges whether the analysis data exceeds a preset value or not (S106).

If the analysis data linked to the decided monitoring object equipment exceeds the preset value according to the analysis data information DB 226, the data decision unit 212 determines that it is an anomaly, and then proceeds to the comment creation processing (S107) by the data output unit 214. If the analysis data does not exceed the preset value, the data decision unit 212 proceeds to tendency extraction processing.

In the comment creation processing, the data output unit 214 extracts, and creates a list of, actual results of alarms and failures from the alarm/failure content 93 stored in the alarm and failure information DB 227 and outputs them as candidates for the comment data to the comment decision processing (S107). Furthermore, the data output unit 214: extracts an actual result of occurrence of the case where the analysis data exceeds the preset value; and outputs it as a candidate for the comment data to the comment decision processing (S107).

In the tendency extraction processing, the data decision unit 212 extracts an increasing tendency or a decreasing tendency of the first analysis item 81 stored in the analysis data information DB 226 and outputs the extraction result as a candidate for the comment data to the comment decision processing (S108). The details will be explained by using FIG. 14.

In the comment decision processing (S109), the data output unit 214 selects the comment data from the candidates for the comment data and outputs it to visualization processing. Specifically, if the actual result of the alarm or failure is included in the candidates for the comment data, the data output unit 214 preferentially selects the actual result of the alarm or failure. Furthermore, if the case where the analysis data exceeds the set value has occurred, the data output unit 214 selects the case preferentially next to the alarm/failure. Then, if these pieces of comment data which should be prioritized do not exist or if the number of the pieces of comment data to be prioritized is small, the data output unit 214 selects the tendency extraction result as the comment data.

In the visualization processing (S110), the data visualization unit 215 automatically creates a report by processing the various kinds of data, including the comment data which is input from the data output unit 214, in a report format, visualizes the created e report, and terminates the processing. This visualization can be performed by display output or print output.

Figure 14:
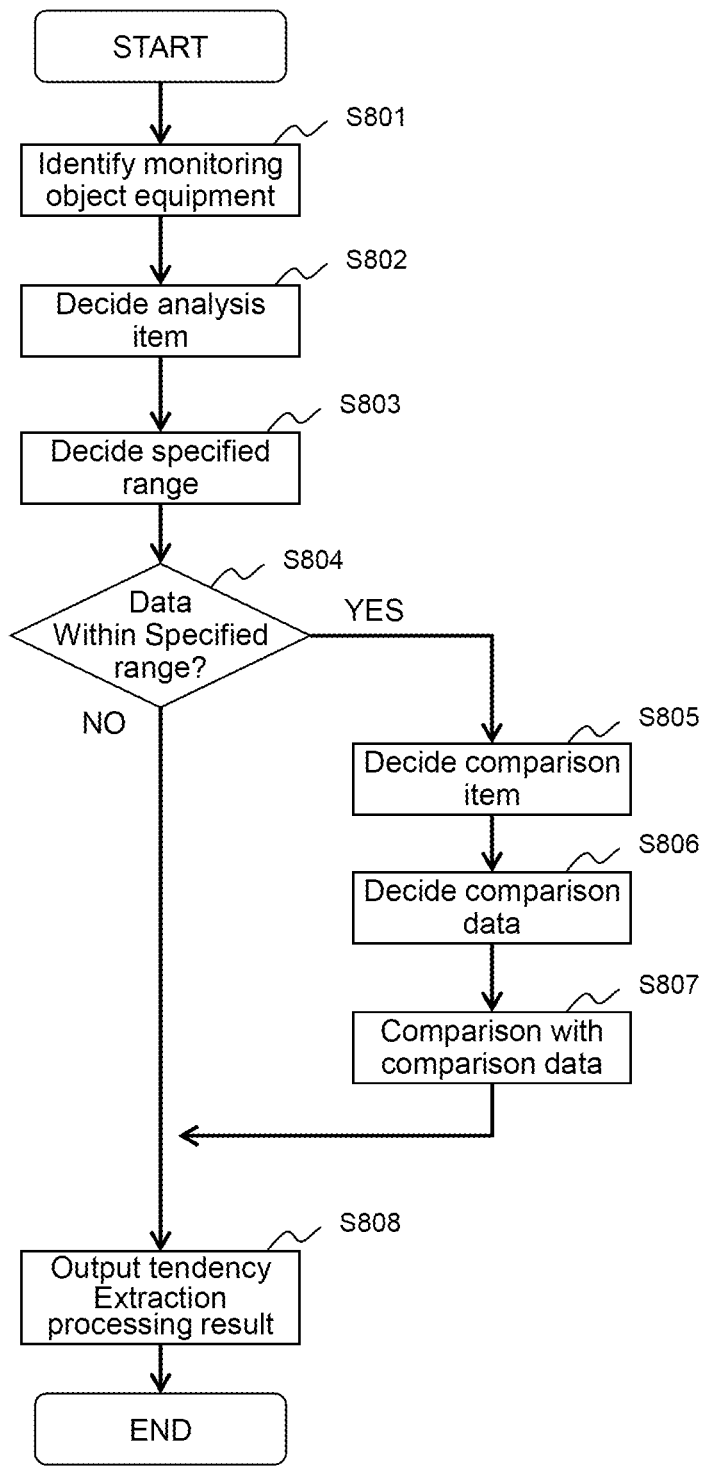
FIG. 14 is a diagram illustrating a processing flow for extracting a tendency.

FIG. 14 is a diagram illustrating a processing flow of extracting the tendency. Once the tendency extraction processing is started, the analysis item decision unit 241 identifies the monitoring object equipment from the monitoring object equipment identifying information (S801). For example, as illustrated in FIG. 6, information such as Equipment 1 as the name of the equipment with the production number linked to XXX1234, "Model A" as the name of the model, "XX State, OO City" as the installation site address, and "Aug. 15, 2015" as the installation date is identified as information of the monitoring object equipment by referring to the equipment identifying information 228 on the basis of the production number XXX1234.

The analysis item decision unit 241 decides the analysis item from the input analysis purpose and the identified result of the monitoring object equipment (S802). For example, if the input reciting "to examine the tendency regarding the temperature" is accepted as the analysis item, the analysis item decision unit 241 refers to the analysis item DB 221 and decides "the internal equipment temperature of the model 'Model A'" as the analysis item as illustrated in FIG. 7.

The specified range decision unit 242 decides the specified range 52 to be from 90° C. to 100° C. as illustrated in FIG. 8 from the decided analysis item (the internal equipment temperature of the model "Model A") and the specified range DB 222 (S803).

The specified range decision unit 242 judges whether data with the numerical value 82 of the analysis item 81 which falls within this range exists or not, by referring to FIG. 11 on the basis of the range from 90° C. to 100° C. which is the specified range 52 in FIG. 8 (S804); and if the data does not exist, the specified range decision unit 242 outputs no tendency as the tendency extraction processing result (S808).

On the other hand, if the data exists within the specified range, the comparison item decision unit 243 decides the comparison item 61 from the comparison item data DB 223 illustrated in FIG. 9 and the analysis item 81 in the analysis data DB 226 illustrated in FIG. 11 (S805). Under this circumstance, the acquisition date and time 80 is decided as 13:00 on May 13, 2019, the analysis item 81 is decided as the internal equipment temperature, the numerical value 82 is decided as 93° C., and the comparison item 61 is decided as the ambient temperature.

The comparison data decision unit 244 decides the comparison data by referring to the comparison data DB 225 on the basis of the value of the analysis item (S806). One example of a method for deciding the comparison data will be explained. Of the data stored in the comparison data DB 226, the numerical value of the analysis item which is the internal equipment temperature, that is, data of 93° C. in this case is decided as the comparison data (S806). In this case, Aug. 15, 2015 as the acquisition date and time 70, the internal equipment temperature as the comparison item 71, 93° C. as the numerical value 72, the ambient temperature as the comparison item 73, and 33 degrees as the numerical value 74 are decided as the comparison data.

The data comparison unit 213 compares the analysis data decided in S805 with the comparison data decided in S805 and the comparison item decided in S806 (S807) and outputs the comparison result as a tendency extraction processing result (S808).

In this case, the acquisition date and time 80 is 13:00 on May 13, 2019, the analysis item 81 is the internal equipment temperature, the numerical value 82 is 93° C., the comparison item 83 is the ambient temperature, and the numerical value 84 is 21 degrees as the analysis data, while the acquisition date and time 70 is Aug. 15, 2015, the comparison item 71 is the internal equipment temperature, the numerical value 72 is 93° C., the comparison item 73 is the ambient temperature, and the numerical value 74 is 33 degrees as the comparison data; and accordingly, when comparing the differences between the internal equipment temperatures and the ambient temperatures, the difference in the analysis data is 72° C. and the difference in the comparison data is 60° C., so that an increasing tendency is output as the result.

According to Embodiment 1, it is possible to provide the monitoring apparatus and monitoring system for diagnosing and visualizing the status of the monitoring object equipment for the sake of the condition based maintenance to perform the maintenance in accordance with the status of each equipment.

Embodiment 2

Figure 15:
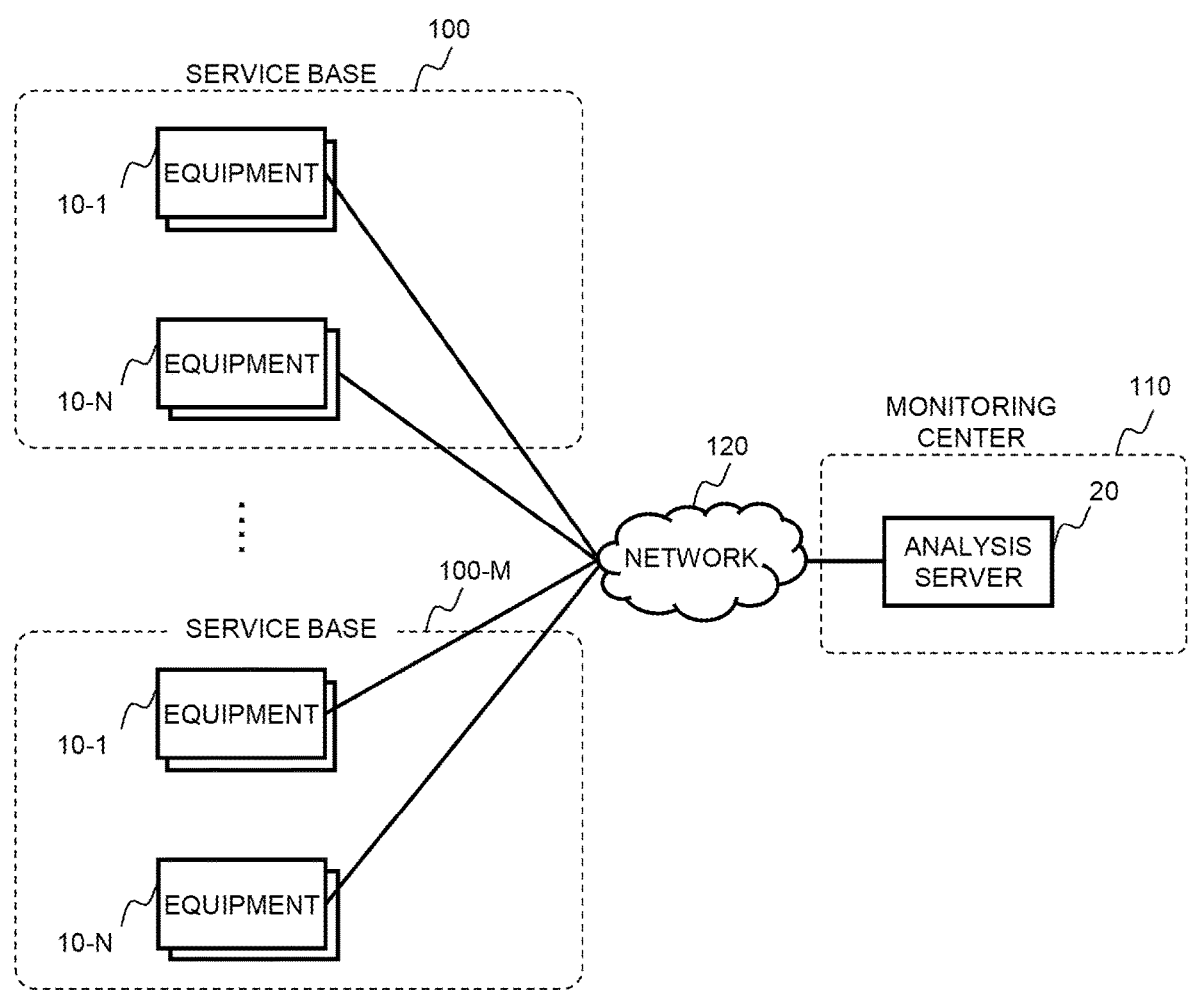
FIG. 15 is a configuration diagram illustrating a monitoring system according to Embodiment 2.

FIG. 15 is a configuration diagram illustrating a monitoring system according to Embodiment 2. The monitoring system according to Embodiment 2 is configured so that a plurality of service bases 100-1 to 100-M and a monitoring center 110 for monitoring the plurality of service bases are connected via a network 120. Furthermore, each of the service bases 100-1 to 100-M has a plurality of pieces of equipment such as equipment 10-1 to 10-N.

The monitoring center 110 has an analysis server 20 for managing information of the operating status and information of alarms and failures which are acquired from the equipment. An explanation is omitted about the same content as that of Embodiment 1. The difference form Embodiment 1 is that each service base such as the service base 100-1 and the analysis server 20 are connected via the network 120. Consequently, the analysis server 20 can use a plurality of pieces of equipment in different areas for comparison with analysis object equipment.

For example, the analysis server 20 according to Embodiment 2 can use data of the same type as that of the analysis item data acquired regarding the equipment of the same machine type as that of the monitoring object equipment. Specifically speaking, if the "internal equipment temperature of the model 'Model A'" is the analysis item data, an "internal equipment temperature" of equipment which is the "model 'Model A'" installed at another service base or the like is used as the comparison item data.

Furthermore, the analysis server 20 according to Embodiment 2 can also use data of the same type as that of the analysis item data acquired regarding the equipment of the same area as that of the monitoring object equipment. Specifically speaking, if the "internal equipment temperature of the model 'Model A'" is the analysis item data, an "internal equipment temperature" of equipment installed in the vicinity (for example, in the same district) is used as the comparison item data.

According to the aforementioned embodiments of the present invention, the analysis server 20 is configured to include: the data input unit 211 which accepts the equipment identifying information for identifying the monitoring object equipment and the analysis purpose; and the data output unit 214 which outputs the tendency of the analysis item data compared with predetermined comparison item data when the analysis item data corresponding to the analysis purpose among the operation data indicating the operating status of the identified monitoring object equipment is a value within the specified range on the basis of the equipment identifying information and the analysis purpose which have been input. The above-described configuration makes it possible to diagnose and visualize the status of the monitoring object equipment for the sake of the condition based maintenance to perform the maintenance in accordance with the status of each equipment.

The specified range herein used is included in the range which does not satisfy a condition for anomaly detection regarding the relevant item data. Specifically speaking, it is possible to diagnose and output what kind of tendency the status of the equipment has, regarding the monitoring object equipment which does not satisfy the condition for the anomaly detection. Therefore, it is possible to report the status of the equipment at an early stage.

Furthermore, the analysis server 20 has the data visualization unit 215 which processes the output from the output unit, creates the comment data for reporting the operating status of the monitoring object equipment, and visualizes a report including the comment data. If there is an actual result which satisfied the condition for the anomaly detection during a target period of the report, this data visualization unit 215 creates the comment data to report the actual result of the anomaly detection; and if there is no actual result which satisfied the condition for the anomaly detection during the target period of the report, the data visualization unit 215 creates the comment data to report the tendency of the analysis item data. Therefore, it is possible to automatically create the report by deciding to adopt or reject information in descending order of importance so that the comment will be made in a proper volume.

Furthermore, the analysis server 20 can use data which is data of a different type from that of the analysis item data and has a correlation with the analysis item data, as the comparison item data. For example, if the analysis item data is an internal equipment temperature of the monitoring object equipment, a surrounding air temperature is used as the comparison item data.

Furthermore, the analysis server 20 can also use data which is data of the same type as that of the analysis item data and is acquired under a different environment from that of the analysis item data, as the comparison item data. For example, data of the same type as that of the analysis item data, which was acquired in the past regarding the monitoring object equipment, can be used as the comparison item data. Furthermore, data of the same type as that of the analysis item data acquired regarding equipment in the same area as that of the monitoring object equipment can be used as the comparison item data.

Furthermore, the analysis server 20 can combine different pieces of comparison item data together and compare them with the analysis item data. Therefore, for example, it is possible to automatically create high-level comments as mentioned below:

"the difference between the internal equipment temperature of the object equipment and the ambient temperature tends to be larger than that between the internal equipment temperature and the ambient temperature at the time of its installment"; "the internal equipment pressure of the object equipment tends to be higher than an average internal equipment pressure of equipment of the same machine type introduced around the same time"; and "the motor current of the object equipment seems to have a lowering tendency, while other equipment of the same area also shows a similar tendency."

Incidentally, in the above-described examples, an explanation has been provided by taking an air compressor as an example of the equipment; however, the equipment may be other industrial equipment such as a transformer.

Furthermore, the present invention is not limited to the embodiments explained above, and includes various variations and equivalent configurations. For example, the aforementioned embodiments have been described in detail in order to explain the invention in an easily comprehensible manner and are not necessarily limited to those having all the configurations explained above. Moreover, part of the configuration of a certain embodiment may be replaced with the configuration of another embodiment. Furthermore, part of the configuration of another embodiment may be added to the configuration of a certain embodiment.

Furthermore, the aforementioned processing by programs may be implemented by hardware by, for example, designing part or whole of such processing by using integrated circuits or the like, or the processing by the hardware and the processing by the programs may be combined together. Information such as programs and tables may be stored in memories, storage devices such as HDDs (Hard Disk Drives) and SSDs (Solid State Drives), or storage media such as IC cards, SD cards, and DVDs. Furthermore, control lines and information lines which are considered to be necessary for the explanation are indicated; however, there may be control lines or information lines other than those indicated.

REFERENCE SIGNS LIST

20: analysis server
110: monitoring center

211: data input unit
212: data decision unit
213: data comparison unit
214: data output unit
215: data visualization unit
221: analysis item DB
222: specified range DB
223: comparison item DB
224: operation data information DB
227: alarm and failure information DB
228: equipment identifying information DB

The invention claimed is:

1. A monitoring system comprising:
a monitoring object equipment, which is an industrial equipment configured to transmit data including a parameter indicating a physical condition of the monitoring object equipment including one or more of a temperature, a current, and a pressure;
a server configured to receive the data transmitted by the monitoring object equipment, the server including a hardware processor and a non-transitory computer-readable medium storing a program with instructions that cause the hardware processor to:
receive, from the monitoring object equipment, equipment identifying information for identifying the monitoring object equipment and an analysis purpose, which includes the parameter indicating the physical condition of the monitoring object equipment; and
output a tendency of an analysis item data compared with predetermined comparison item data;
wherein the analysis item data, which has a value within a specified range and is selected from among operation data indicating an operating status of the monitoring object equipment, corresponds to the parameter indicating the physical condition of the monitoring object equipment;
wherein the specified range is based on the equipment identifying information and the analysis purpose which have been input;
wherein the comparison item data is data which is of a type different from that of the analysis item data and has a correlation with the analysis item data; and
wherein when the analysis item data is an internal equipment temperature of the monitoring object equipment, a surrounding air temperature is used as the comparison item data.

2. The monitoring system according to claim 1,
wherein the specified range is included in a range that does not satisfy a condition for anomaly detection regarding relevant item data.

3. The monitoring system according to claim 1, wherein the instructions further cause the hardware processor to generate comment data for reporting the operating status of the monitoring object equipment and illustrate a report including the comment data on a display screen.

4. The monitoring system according to claim 3,
wherein the specified range is included in a range that does not satisfy a condition for anomaly detection regarding relevant item data; and
wherein if there is an actual result which satisfies the condition for the anomaly detection during a target period of the report, the data visualization unit generates the comment data for reporting the actual result of the anomaly detection; and
if there is no actual result which satisfies the condition for the anomaly detection during the target period of the report, the data visualization unit generates the comment data for reporting the tendency of the analysis item data.

5. The monitoring system according to claim 1,
wherein the comparison item data is acquired under an environment different from that of the analysis item data.

6. The monitoring system according to claim 5,
wherein the comparison item data was acquired in past regarding the monitoring object equipment.

7. The monitoring system according to claim 5,
wherein the comparison item data is acquired regarding equipment of a same machine type as that of the monitoring object equipment.

8. The monitoring system according to claim 5,
wherein the comparison item data is acquired regarding equipment of a same area as that of the monitoring object equipment.

9. A monitoring apparatus comprising:
a hardware processor configured to receive data from a monitoring object equipment, which is an industrial equipment, the data including a parameter indicating a physical condition of the monitoring object equipment including one or more of a temperature, a current, and a pressure; and
a non-transitory computer-readable medium storing a program with instructions that cause the hardware processor to:
receive equipment identifying information for identifying the monitoring object equipment and an analysis purpose, which includes the parameter indicating the physical condition of the monitoring object equipment; and
output a tendency of an analysis item data compared with predetermined comparison item data;
wherein the analysis item data, which has a value within a specified range and is selected from among operation data indicating an operating status of the monitoring object equipment, corresponds to the parameter indicating the physical condition of the monitoring object equipment;
wherein the specified range is based on the equipment identifying information and the analysis purpose which have been input;
wherein the comparison item data is data which is of a type different from that of the analysis item data and has a correlation with the analysis item data; and
wherein when the analysis item data is an internal equipment temperature of the monitoring object equipment, a surrounding air temperature is used as the comparison item data.

10. A monitoring method comprising:
receiving equipment identifying information for identifying monitoring object equipment, which is an industrial equipment, and an analysis purpose, which includes a parameter indicating a physical condition of the monitoring object equipment including one or more of a temperature, a current, and a pressure;
determining whether an analysis item data has a value within a specified range, and determining comparison item data to be used for a comparison with the analysis item data; and
outputting, for the specified range, a tendency of the analysis item data compared with the comparison item data;
wherein the analysis item data is selected from among operation data indicating an operating status of the monitoring object equipment, and the analysis item data corresponds to the parameter indicating the physical condition of the monitoring object equipment;

wherein the specified range is based on the equipment identifying information and the analysis purpose which have been input;

wherein the comparison item data is data which is of a type different from that of the analysis item data and has a correlation with the analysis item data; and wherein when the analysis item data is an internal equipment temperature of the monitoring object equipment, a surrounding air temperature is used as the comparison item data.

* * * * *